(12) United States Patent
Wang et al.

(10) Patent No.: US 11,906,474 B2
(45) Date of Patent: Feb. 20, 2024

(54) HIGH-THROUGHPUT AND SMALL SIZE SAMPLES TENSION, COMPRESSION, BENDING TEST SYSTEM AND METHOD THEREOF

(71) Applicant: NCS Testing Technology CO., LTD, Beijing (CN)

(72) Inventors: Guiyong Wang, Beijing (CN); Haizhou Wang, Beijing (CN); Peng Wang, Beijing (CN); Linmao Zhu, Beijing (CN); Tiezhu Zhu, Beijing (CN); Lei Zhao, Beijing (CN); Donglin Li, Beijing (CN)

(73) Assignee: NCS Testing Technology CO., LTD, Beijing (CN)

( * ) Notice: Subject to any disclaimer, the term of this patent is extended or adjusted under 35 U.S.C. 154(b) by 467 days.

(21) Appl. No.: 17/333,012

(22) Filed: May 28, 2021

(65) Prior Publication Data
US 2021/0364399 A1    Nov. 25, 2021

(51) Int. Cl.
| | |
|---|---|
| *G01N 3/06* | (2006.01) |
| *G01N 3/04* | (2006.01) |
| *G01N 3/20* | (2006.01) |
| *G01N 3/08* | (2006.01) |

(52) U.S. Cl.
CPC ......... *G01N 3/06* (2013.01); *G01N 2203/003* (2013.01); *G01N 2203/0017* (2013.01); *G01N 2203/0019* (2013.01); *G01N 2203/0023* (2013.01); *G01N 2203/0026* (2013.01); *G01N 2203/06* (2013.01)

(58) Field of Classification Search
CPC ............ G01N 3/06; G01N 2203/0017; G01N 2203/0019; G01N 2203/0023; G01N 2203/0026; G01N 2203/003; G01N 2203/06; G01N 35/00623; G01N 3/24; G01N 19/04; G01N 3/26; G01N 29/04; G01N 3/12; G01N 3/10; G01N 3/03; G01L 5/0038
See application file for complete search history.

(56) References Cited

FOREIGN PATENT DOCUMENTS

| CN | 109406304 A | * | 3/2019 | ............... G01N 3/28 |
|---|---|---|---|---|
| CN | 110333135 A | * | 10/2019 | |
| CN | 114646540 A | * | 6/2022 | |

* cited by examiner

*Primary Examiner* — Brandi N Hopkins (57) ABSTRACT

A high-throughput and small size samples tension, compression, bending test system is disclosed. The system includes a computer unit, a motor and a number of the sample testing modules mounted horizontally or perpendicular to that ground on a workbench. The sample testing modules include a sample testing modules base plate fixedly attached to the workbench, and a ball screw, a displacement sensor, a moving beam, a clamp unit, a linear moving platform unit and a force value sensor arranged on the sample testing modules base plate. A number of the sample testing modules are arrange in parallel on the workbench or uniformly distributed in a circumferential direction with a point on the workbench as a circular center.

23 Claims, 8 Drawing Sheets

HIGH-THROUGHPUT AND SMALL SIZE SAMPLES TENSION, COMPRESSION, BENDING TEST SYSTEM AND METHOD THEREOF

TECHNICAL FIELD

The present disclosure relates to the field of mechanical testing of metallic materials and non-metallic materials, and more specifically, to a high-throughput and small size force value samples tension, compression, bending test system and a testing method. By providing power source through a single motor, tests of tension, compression and bending of a number of samples can be conducted simultaneously, thus obtaining the test curve and test parameters of the samples.

BACKGROUND

In the research and production of materials, the testing of mechanical properties of materials is of significant to evaluate the properties of materials. The parameters for testing the mechanical properties of materials include yield strength, tension strength, elongation, elastic modulus, ratio of Basson, shear strength, flexural strength, hardness, impact toughness, and creep rupture strength, etc. Corresponding testing equipments include material universal testing machine, impact testing machine, durometer, high temperature creep strength testing machine and so on. In the development and production of materials, especially in the development of new materials, it is necessary to carry out repeated large-scale tests on the materials. Limited by their own structural characteristics, in general, only one sample can be tested at a time, and the size of the test sample is relatively large, the actual sample is easy to be destroyed. It is difficult to meet the requirements of high-throughput, multi-parameter, cross-scale testing of mechanical properties of complex materials in the development of new materials and scientific research.

SUMMARY

In order to solve the above technical problem, the disclosure provides a high-throughput system and method for mechanical properties of small size samples, which can perform tension, compression, bending tests on a number of samples simultaneously, and obtains the tension, compression and bending test curves and test parameters of each the samples.

In order to achieve the above object, the disclosure provides the following technical scheme:

A high-throughput and small size samples tension, compression, bending test system includes: a computer unit, a motor 1, a number of sample testing modules 2 mounted on a workbench 3 horizontally or vertically to the ground.

The sample testing modules 2 include sample testing modules base plates 39 secured to the workbench 3, a ball screw 16, a displacement sensor 17, a moving beam 18, a clamp unit 19, a linear moving platform unit 23 and a force value sensor 24 provided on the sample testing modules base plates 39. The ball screw 16 and the linear moving platform unit 23 are respectively disposed at both two ends of the clamp unit 19.

The inner end of the ball screw 16 is fixed to the transmission devices, and the ball screw pair and the moving beam 18 are driven synchronously along the linear guide rail. The displacement sensor 17 is installed on the side surface of a linear guide rail fixing base 30 for detecting the movement displacement of the moving beam 18 in real time.

The linear moving platform unit 23 includes a trapezoidal screw/lead screw 42 and a linear moving platform guide rail 29. The trapezoidal screw/lead screw 42 slides controllably along the linear moving platform guide rail 29. The force value sensor 24 is fixed on a trapezoidal screw/lead screw pair fixing base 28 through a force value sensor fixing base 25.

The outer end surface of the moving beam 18 is fixedly connected with a first clamp connecting rod 38, the force value sensor 24 is fixedly connected with a second clamp connecting rod 41. Two holding portions of the clamp unit 19 for holding a sample 22 are secured to the first clamp connecting rod 38 and the second clamp connecting rod 41 respectively.

A number of sample testing modules 2 are arranged in parallel on the workbench 3, or a number of the sample testing modules 2 are uniformly distributed in a circumferential direction with a point on the workbench 3 as the center, and the ball screw 16 of each the sample testing modules 2 towards the center of the circle. The motor 1 drives the ball screw 16 of each the sample testing modules 2 to rotate synchronously through a pair of multiple the transmission devices, realizing the synchronous back and forth movement of the moving beam 18 of each the sample testing modules 2, and further realizing the synchronous tension, compression, bending and other tests of the sample 22.

The computer unit is respectively connected to the motor 1, the displacement sensor 17, the force value sensor 24, a physical field unit 20 and a visual observation unit 21. The computer unit can independently collect the test data of the displacement sensor 17 and the force value sensor 24 of each the sample testing modules 2, and calculate and plot the respective measurement parameters and test curves.

A number of the sample testing modules 2 can selectively independently perform the mechanical property tests on the same or different the samples 22.

The ball screw 16 is installed on the sample testing modules base plate 39 through an inner end ball screw fixing base 37 and an outer end ball screw fixing base 33. Two mutually parallel linear guide rails 36 are symmetrically disposed on the left and right sides of the ball screw 16. The ball screw 16 is connected with a ball screw pair fixing base 35 between the inner end ball screw fixing base 37 and the outer end ball screw fixing base 33. The moving beam 18 is located at the outer end side of the ball screw 16, and the moving beam 18 and the ball screw pair fixing base 35 are parallel to each other and fixed to each other through the moving beam connecting piece 34. The moving beam 18 and the ball screw pair fixing base 35 are both mounted on the two linear guide rails 36 through a pair of sliders.

In the linear moving platform unit, the trapezoidal screw/lead screw 42 is mounted on the sample testing modules base plate 39 through the trapezoidal screw/lead screw fixing base 40. Two mutually parallel linear moving platform guide rails 29 are symmetrically arranged on the left and right sides of the trapezoidal screw/lead screw 42. The inner end of the trapezoidal screw/lead screw 42 is provided with the trapezoidal screw/lead screw pair fixing base 28. The trapezoidal screw/lead screw pair fixing base 28 is mounted on the two linear moving platform guide rail 29 through a pair of sliders.

A number of the sample testing modules 2 are capable of simultaneously performing one of the tension, compression, bending tests.

The clamp types of the clamp unit 19 includes a bar sample clamp, a plate sample clamp, a film sample clamp, a wire clamp, a spring clamp, a three-point bending clamp or a compression clamp.

The motor 1 is a servo motor or a stepping motor, and the controlling mode is a speed controlling mode.

The displacement sensor 17 is a contact type displacement sensor or a non-contact type displacement sensor.

The force value sensor 24 is a spoke type force value sensor, a column type force value sensor or an S type force value sensor.

The physical field unit 20 is one of a temperature field, a magnetic field, a corrosion field or combinations thereof.

The sample 22 size ranges from 0.1 mm to 120 mm.

Two ends of the linear guide rails 36 are provided with safety limiting devices 31. The trapezoidal screw/lead screw 42 has a self-locking function, and the outer end of the trapezoidal screw/lead screw 42 is provided with a hand wheel 26 for adjusting.

The sample testing modules 2 further includes the physical field unit 20 arranged outside the clamp unit 19.

The sample testing modules 2 further includes a visual observation system 21. The visual observation system 21 is provided above the clamp unit 19, and capable of observing the test course of the samples 22 and capturing and analyzing video or images.

The force value sensor 24 is fixed to an outer end surface or an inner end surface of the force value sensor fixing base 25. When the force value sensor 24 is fixed to the outer end surface of the force value sensor fixing base 25, the second clamp connecting rod 41 passes through the force value sensor fixing base 25 and is fixed to the force value sensor 24. When the force value sensor 24 is fixed to the inner end surface of the force value sensor fixing base 25, the second clamp connecting rod 41 is connected directly to the force value sensor 24.

When a number of the sample testing modules 2 are uniformly distributed in that circumferential direction with a point on the workbench 3 as a center and the ball screw 16 of each of the sample testing modules 2 is directed toward the center, the transmission is a conical gear transmission 4 having a deceleration system 8. The conical gear transmission 4 includes a large conical gear 6 and a small conical gear 7. The deceleration system 8 is installed at the bottom of the workbench 3. The input end of the deceleration system 8 is connected with the power output shaft of the motor 1. An output shaft 5 of the deceleration system 8 passes out from the central symmetrical point of a number of the sample testing modules 2 on the workbench 3. The conical gear 6 is fixed to the output shaft 5 of the deceleration system 8. The inner end of the ball screw 16 of each of the sample testing modules 2 is fixed to one of the small conical gear 7. A number of the small conical gears 7 intermesh with the large conical gear 6. The deceleration system 8 includes one or more of a speed reducer, a synchronous pulley speed reduction system or a gear speed reduction system.

When a number of the sample testing modules 2 are arranged side by side on the workbench 3, the transmission device is turbine worm gear 9. The turbine worm gear 9 includes an active worm gear 14, an active worm 15, a passive worm gear 11, a passive worm 12 and a coupling 13. The power output shaft of the motor 1 is fixed to the active worm 15, and the active worm gear 14 and the active worm 15 are engaged with each other. The left and right ends of the worm gear shaft of the active worm gear 14 are respectively connected to a number of the passive worm 12 by the coupling 13. The coupling 13 is mounted on a worm support base 10. The inner end of the ball screw 16 of each of the sample testing modules 2 is fixed to the passive worm gear 11 intermeshing with corresponding the passive worm 12.

The high-throughput and small size samples tension, compression, bending test method, includes the following steps:

(1) Selecting the clamp unit 19 according to the size and the mechanical properties of a number of the samples 22 to be tested, and fixing each samples 22 on the two holding portions of the clamp unit 19;

(2) Installing each of the clamp units 19 on each of the sample testing modules 2, selecting the type of test to be tested and inputting the dimensional parameters of each of the sample 22 from the operation interface of the computer unit;

(3) Starting the test while setting the speed control mode on the operation interface to control the samples; collecting, calculating and processing the detection data of the displacement sensor 17 and the force value sensor 24 of each of the sample testing modules 2 in real time, and drawing the test process curve until the whole test is finished.

The method further includes: before testing, determining whether a temperature field, a magnetic field or a corrosion physical field shall be loaded according to a test need.

During the test, each of the sample testing modules 2 operates independently and does not affect each other, and the end of one of the sample testing modules 2 test does not affect the continuation of the other of the sample testing modules 2 test.

Compared with the prior art, the disclosure has the following advantages:

2. A single motor can be used to test the mechanical properties of the multiple samples at the same time, which can meet the requirements of high-throughput testing of the mechanical properties of materials.

2. The tension, compression and bending tests can be carried out simultaneously for the samples of different materials, different sizes and different lengths.

3. The sample test unit adopts the modular design, and the test unit can be expanded according to the test needs.

4. The computer unit independently judges the working state of each the sample test modules, and collects and processes the test data. Finally, obtaining the stress-strain curve, yield strength, tension strength, elastic modulus of each the test samples. The completion of one of the test samples does not affect the continuation of other tests until the completion of all tests.

5. A speed controlling mode is adopted, and is easy to operate.

6. The temperature field, magnetic field, corrosion field and other modules can be selected to test the mechanical properties under the conditions of multi-physical field.

7. Visual observation, image data acquisition and analysis of the test process can be performed as required.

In the drawings:
1 the motor;
2 the sample testing modules;
3 the workbench;
4 the conical gear transmission;
5 the output shaft;
6 the large conical gear;
7 the small conical gear;
8 the deceleration system;
9 the turbine worm gear;
10 the worm support base;
11 the passive worm gear;
12 the passive worm;
13 the coupling;
14 the active worm gear;
15 the active worm;
16 the ball screw;
17 the displacement sensor;
18 the moving beam;
19 the clamp unit;
20 the physical field unit;
21 the visual observation unit;
22 the samples;
23 the linear moving platform unit;
24 the force value sensor;
25 the force value sensor fixing base;
26 the hand wheel;
27 the linear moving platform guide rail fixing base;
28 the trapezoidal screw/lead screw pair fixing base;
29 the linear moving platform guide rail;
30 the linear guide rail fixing base;
31 the safety limiting devices;
32 the displacement sensor mounting plate;
33 the outer end ball screw fixing base;
34 the moving beam connecting piece;
35 the ball screw pair fixing base;
36 the linear guide rails;
37 the inner end ball screw fixing base;
38 the first clamp connecting rod;
39 the sample testing modules base plate;
40 the trapezoidal screw/lead screw fixing base;
41 the second clamp connecting rod;
42 the trapezoidal screw/lead screw.

DETAILED DESCRIPTION OF EMBODIMENTS

Hereinafter, the disclosure will be further described with reference to the drawings and embodiments.

A high-throughput and small size samples tension, compression, bending test system includes: a computer unit, a motor 1, a number of sample testing modules 2 mounted on a workbench 3 horizontally or vertically to the ground. The details are described independently below:

The sample testing modules 2 of the high-throughput and small size samples tension, compression, bending tests system.

As shown in FIG. 1A, FIG. 1B, FIG. 2B and FIG. 3A, the sample testing modules 2 includes the sample testing modules base plate 39 secured to the workbench 3, and the ball screw 16, the displacement sensor 17, the moving beam 18, the clamp unit 19, the physical field unit 20, and the visual observation unit 21 provided on the sample testing modules base plate 39, the linear moving platform unit 23 and the force value sensor 24.

Figure 1A:
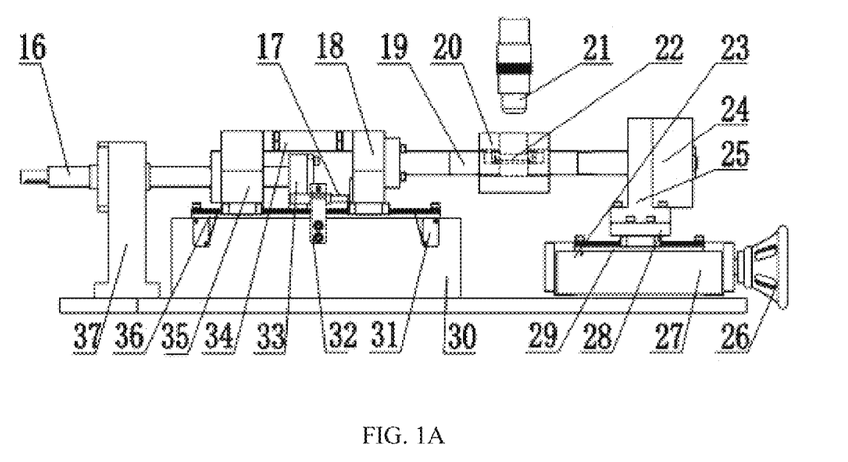
FIG. 1A is a schematic front view of the sample testing modules of the high-throughput and small size samples tension, compression, bending tests system of the disclosure.
Figure 1B:
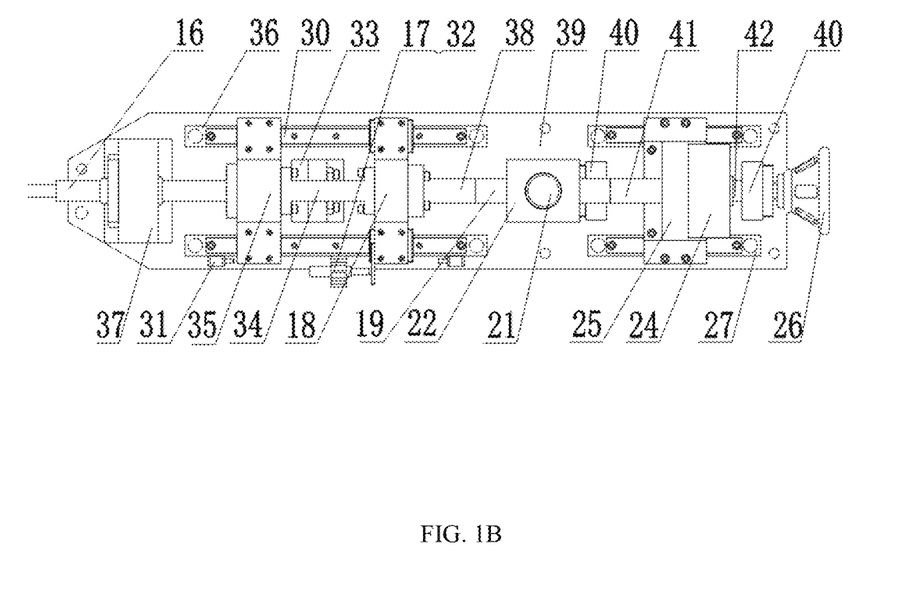
FIG. 1B is a schematic top view of the sample testing module of the high-throughput and small size samples tension, compression, bending tests system of the disclosure.

The ball screw 16 is mounted on the sample testing modules base plate 39 through the inner end ball screw fixing base 37 and the outer end ball screw fixing base 33. The two parallel linear guide rails 36 are symmetrically disposed on the left and right sides of the ball screw 16 through the linear guide rail fixing base 30 fixed on the sample testing modules base plate 39. The ball screw 16 is connected with the ball screw pair fixing base 35 between the inner end ball screw fixing base 37 and the outer end ball screw fixing base 33, and the moving beam 18 is located on the outer end side of the ball screw 16. The moving beam 18 and the ball screw pair fixing base 35 are parallel to each other and fixed to each other by the moving beam connecting piece 34. The moving beam 18 and the ball screw pair fixing base 35 are both mounted on the two linear guide rails 36 by a pair of sliders. The displacement sensor 17 is mounted on the side surface of the linear guide rail fixing base 30 through the displacement sensor mounting plate 32, and the displacement sensor 17 is used for detecting the movement displacement of the moving beam 18 in real time. The two ends of the linear guide rails 36 are provided with the safety limiting devices 31.

The linear moving platform unit 23 is located on the outer end surface end of the moving beam 18, the linear moving platform unit 23 includes the trapezoidal screw/lead screw 42 and the linear moving platform guide rail 29, and the trapezoidal screw/lead screw 42 is mounted on the sample testing modules base plate 39 through the trapezoidal screw/lead screw fixing base 40. The two parallel linear moving platform guide rails 29 are symmetrically disposed on the left and right sides of the trapezoidal screw/lead screw 42 through a linear moving platform guide rail fixing base 27 fixed on the sample testing modules base plate 39. The inner end of the trapezoidal screw/lead screw 42 is provided with the trapezoidal screw/lead screw pair fixing base 28. The trapezoidal screw/lead screw pair fixing base 28 is mounted on the two linear moving platform guide rails through a pair of sliders. The force value sensor 24 is fixed to the trapezoidal screw/lead screw pair fixing base 28 through the force value sensor fixing base 25. The trapezoidal screw/lead screw 42 has a self-locking function, the outer end of the trapezoidal screw/lead screw 42 is provided with the hand wheel 26 for adjusting. The hand wheel 26 for adjusting can be rotated to move the linear moving platform unit 23, and it is convenient to clamp the samples 22 for use and adjust the distance according to the samples 22 of different lengths, so that the samples 22 of different lengths can be tested at the same time.

The first clamp connecting rod 38 is fixed to the outer end surface of the moving beam 18. The second clamp connecting rod 41 is fixed to the force value sensor 24. The two holding portions of the clamp unit 19 located inside the physical field unit 20 for clamping the sample 22 are fixed to the first clamp connecting rod 38 and the second clamp connecting rod 41 respectively. The visual observation unit 21 is arranged above the clamp unit 19 and is capable of observing the test process of the samples 22 and of acquiring and analyzing video or images.

A number of the sample testing modules 2 are arranged in parallel on the workbench 3, or a number of the sample testing modules 2 are uniformly distributed in the circumferential direction with a point on the workbench 3 as the center. The motor 1 drives the ball screws 16 of each of the sample testing modules 2 to rotate synchronously through the transmission device, and synchronous back and forth movement of the moving beam 18 of each the sample testing modules 2 is realized, and thus synchronous tension, compression, bending and other tests of the sample 22 are realized.

The computer unit is connected to the motor 1, the displacement sensor 17, the force value sensor 24, the physical field unit 20 and the visual observation unit 21 respectively. The computer unit can independently collect and calculate the test data of the displacement sensor 17 and the force value sensor 24 of each of the sample testing modules 2, and calculate and plot the respective measurement parameters and test curves. Each of the sample testing modules 2 may optionally perform the mechanical property test independently, and the samples 22 in each of the sample testing modules 2 may be the same sample or different samples.

The force value sensor 24 is fixed to the outer end surface of the force value sensor fixing base 25, or may be fixed to the inner end surface thereof. When the force value sensor 24 is fixed to the outer end of the force value sensor fixing base 25, the second clamp connecting rod 41 is fixed to the force value sensor 24 through the force value sensor fixing base 25. When the force value sensor 24 is fixed to the inner end surface of the force value sensor fixing base 25, the second clamp connecting rod 41 is fixed directly to the force value sensor 24.

The high-throughput and small size samples tension, compression, bending tests system adopts conical gear transmission mode.

Figure 2A:
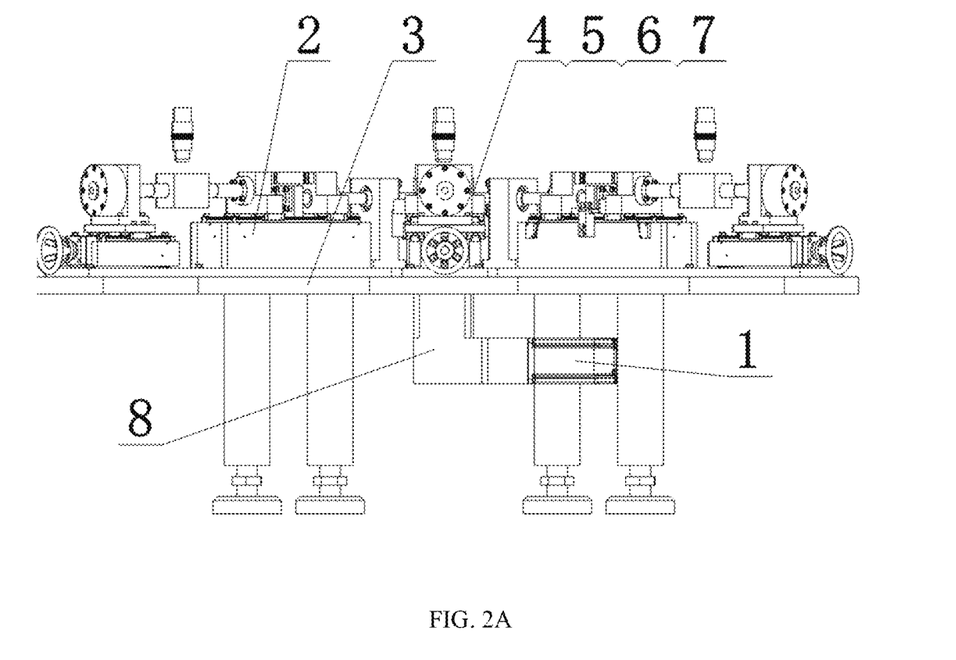
FIG. 2A is a schematic front view of a horizontal arrangement when the conical gear transmission system is used for the power transmission of the high-throughput and small size samples tension, compression, bending tests system of the disclosure.
Figure 2B:
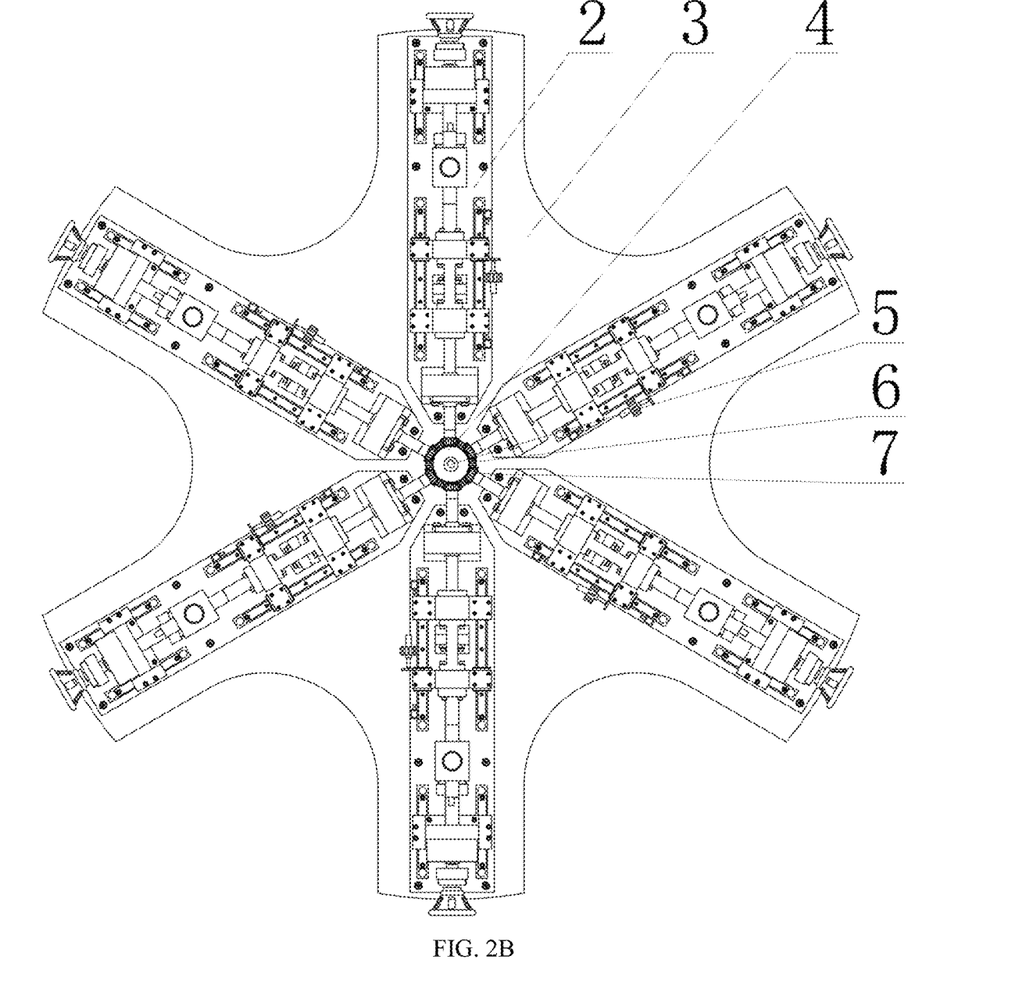
FIG. 2B is a schematic front view of a vertical arrangement when the conical gear transmission system is used for the power transmission of the high-throughput and small size samples tension, compression, bending tests system of the disclosure.
Figure 2C:
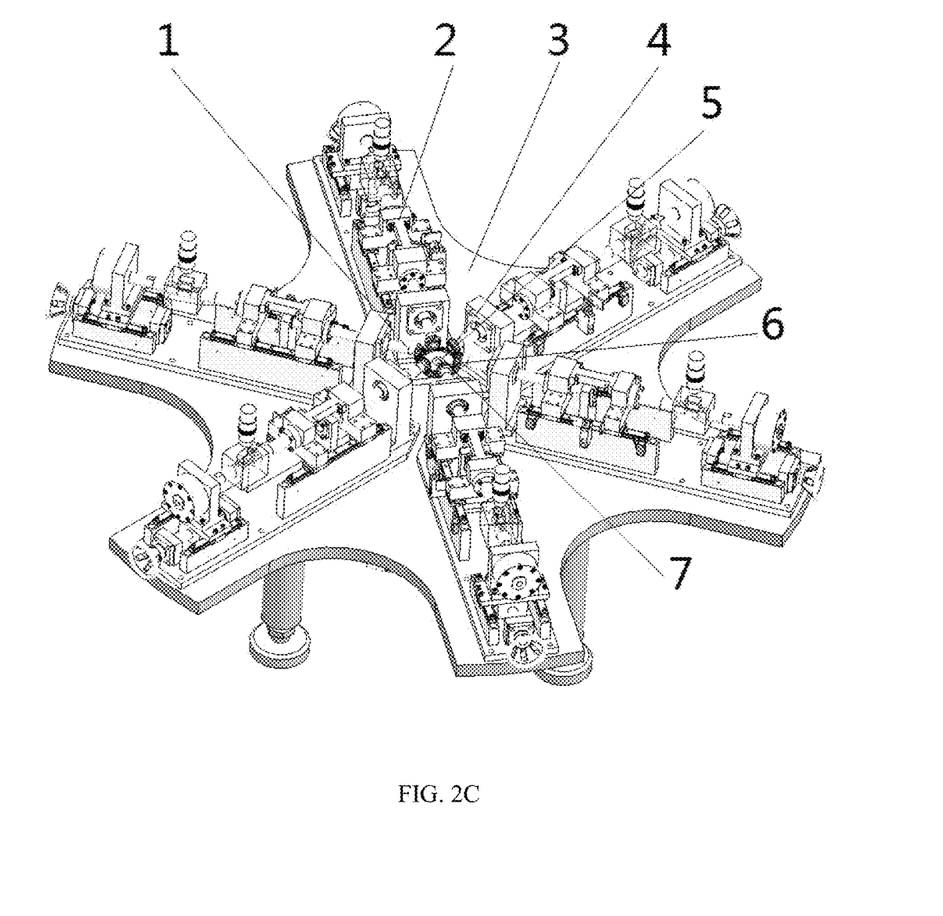
FIG. 2C is a three-dimensional schematic diagram when the conical gear transmission system is used for the power transmission of the high-throughput and small size samples tension, compression, bending tests system of the disclosure.

In one embodiment, as shown in FIG. 2A, FIG. 2B and FIG. 2C, when a number of the sample testing modules 2 are uniformly distributed in that circumferential direction with a point on the workbench 3 as the center and the ball screw 16 of each the sample testing modules 2 towards the center, the transmission is a conical gear transmission 4 with the deceleration system 8. The conical gear transmission 4 includes the large conical gear 6 and the small conical gear 7. The deceleration system 8 is mounted on the bottom of the workbench 3, the input end of the deceleration system 8 is connected with the power output shaft of the motor 1 and the output shaft 5 of the deceleration system 8 passes through the central symmetric point of the plurality of the sample testing modules 2 on the workbench 3. The large conical gear 6 is fixed to the output shaft 5 of the deceleration system 8; and the inner end of the ball screw 16 of each of the sample testing modules 2 is fixed to one of the small conical gears 7. A number of the small conical gears 7 mesh with the large conical gear 6. During the operation of the motor 1, the motor 1 drives the large conical gear 6 to rotate through the deceleration system 8, and the large conical gear 6 drives the small conical gear 7 to rotate. The ball screw 16 of each of the sample testing modules 2 is driven to rotate, and the moving beam 18 is synchronously moved back and forth, so as to realize the testing function.

The number of the sample testing modules 2 is greater than or equal to 2, and can be infinitely extended by increasing the power of the motor 1 and increasing the transmission ratio of the large conical gear 6 to the small conical gear 7.

A number of the sample testing modules 2 may simultaneously perform one of the tension, compression, and bending tests.

Further, the deceleration system 8 may be composed of one or more combinations of a speed reducer, a synchronous pulley speed reduction system or a gear speed reduction system.

The high-throughput and small size samples tension, compression, bending test system adopts adopts turbine and worm transmission mode.

Figure 3A:
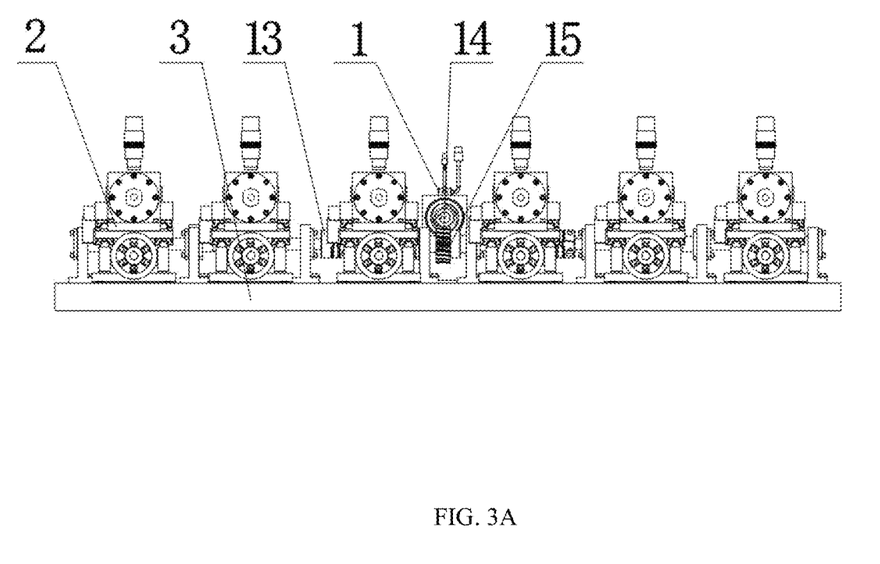
FIG. 3A is a schematic front view of the horizontal arrangement when the turbine worm gear system is used for the power transmission of the high-throughput and small size samples tension, compression, bending tests system of the disclosure.
Figure 3B:
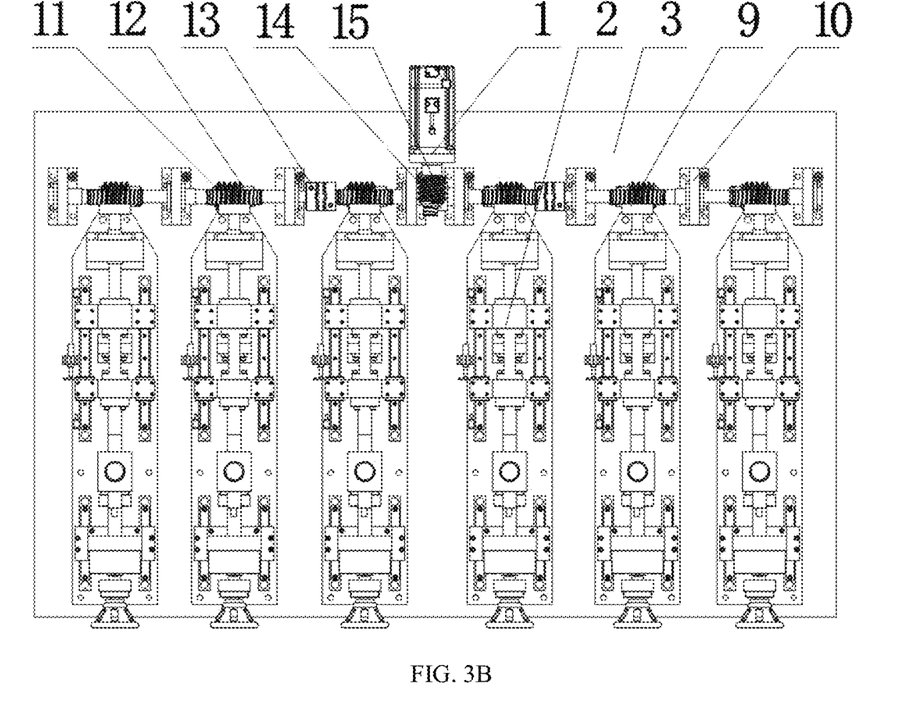
FIG. 3B is a schematic front view of the vertical arrangement when the turbine worm gear system is used for the power transmission of the high-throughput and small size samples tension, compression, bending tests system of the disclosure.
Figure 3C:
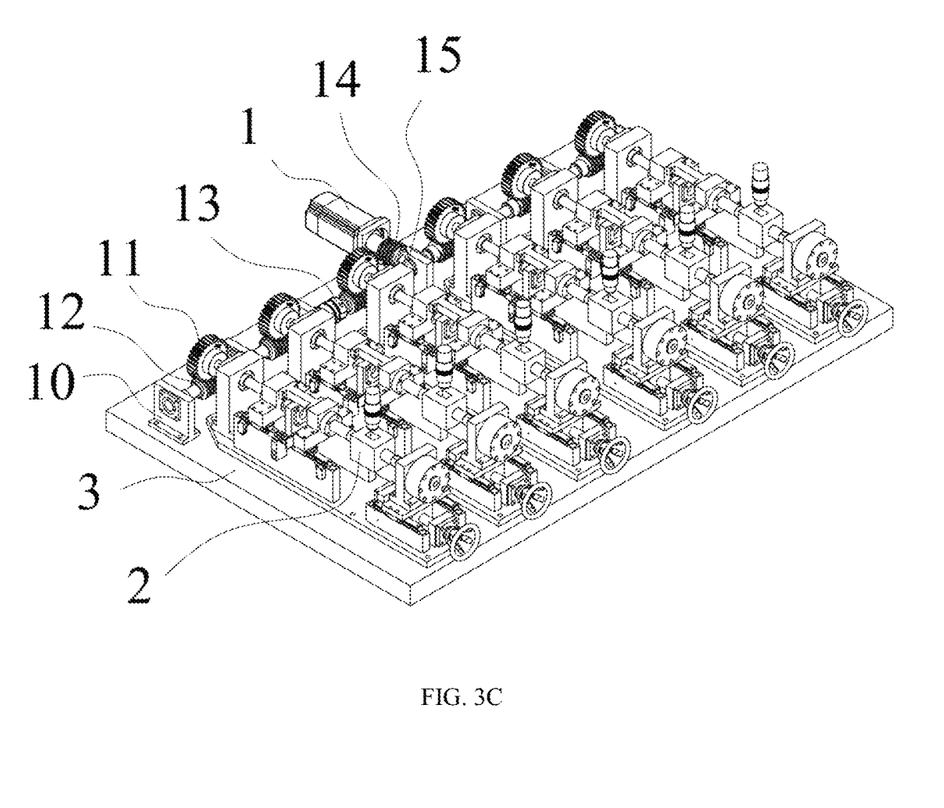
FIG. 3C is a three-dimensional schematic diagram when the turbine worm gear system is used for the power transmission of the high-throughput and small size samples tension, compression, bending tests system of the disclosure.

As shown in FIG. 3A, FIG. 3B and FIG. 3C, as an embodiment, when a number of the sample testing modules 2 are arranged side by side on the workbench 3, the transmission is the turbine worm gear 9. The sample testing modules 2 may be arranged on the workbench 3 horizontally or vertically to the ground. The turbine worm gear 9 includes an active worm gear 14, an active worm 15, a passive worm gear 11, a passive worm 12 and a coupling 13; and a power output shaft of the motor 1 is fixed to the active worm 15. The active worm gear 14 and the active worm 15 are engaged with each other, and the left and right ends of the worm gear shaft of the active worm gear 14 are respectively connected to a number of the passive worm 12 by the coupling 13. The coupling 13 is mounted on the worm support base 10, and the inner end of the ball screw 16 of each of the sample testing modules 2 is fixed to the passive worm gear 11 intermeshed with corresponding the passive worm 12. When the motor 1 is working, the motor 1 drives the active worm 15 and drives the active worm gear 14 to rotate, the active worm gear 14 drives the number of the passive worms 12 to rotate and drives the plurality of the passive worm gear 11 to rotate; then, the ball screw 16 of each of the sample testing modules 2 is driven to rotate, and the moving beam 18 is synchronously moved back and forth, so as to realize the testing function.

The number of the sample testing modules is equal to or greater than 2, and can be infinitely extended by increasing the power of the motor 1 and increasing the passive worm 12 and the passive worm gear 11 to infinitely expand.

A number of the sample testing modules 2 may simultaneously perform one of the tension, compression, and bending tests.

The sample testing modules 2 to be tested can be selected through the operation interface of the computer unit, and the type of test to be performed and the parameters of the sample to be tested can be input respectively. The completion of a test sample does not affect the continuation of other tests until all tests are completed.

The clamp types of the clamp unit 19 includes: a bar sample clamp, a plate sample clamp, a film sample clamp, a wire clamp, a spring clamp, a three-point bending clamp and a compression clamp.

The motor 1 is a servo motor or a stepping motor, and the control mode is a speed controlling mode.

The displacement sensor 17 is a contact type displacement sensor or a non-contact type displacement sensor.

The force value sensor 24 is a spoke type force value sensor, a column type force value sensor or an S type force value sensor.

The physical field unit 20 is one or multiple of a temperature field, a magnetic field, or a corrosion field.

The sample 22 size ranges from 0.1 mm to 120 mm.

Test Method for the high-throughput and small size samples tension, compression, bending tests system The high-throughput and small size samples tension, compression, bending tests method includes the following steps:

(6) Selecting clamp unit 19 according to the size and the mechanical properties of the number of the samples 22 to be tested, and fixing each of the samples 22 on the two holding portions of the clamp unit 19;

(7) Installing each one of the clamp units 19 on each of the sample testing modules 2, selecting the type of test to be tested and inputting the dimensional parameters of each one of the sample 22 from the operation interface of the computer unit;

(8) Determining whether physical fields such as a temperature field, a magnetic field or corrosion physical field shall be loaded according to a test need;

(9) Determining whether a visual observation of the test process shall be conducted according to the test need;

(10) In the operation interface, the speed control mode is set to control a plurality of the sample while starting the test, and the detection data of the displacement sensor 17 and the force value sensor 24 of each of the sample testing modules 2 are collected, calculated and processed in real time, and draw the test process curve until the end of the whole test.

In the test process, each of the sample testing modules 2 operates independently without affecting each other, and the end of a certain test will not affect the continuation of other test until the test of each testing modules is finished. A simultaneously testing the mechanical properties of any number of the samples is thus achieved, and providing a solution for exploring the high-throughput testing of the mechanical properties of materials.

The invention claimed is:

1. A high-throughput and small size samples tension, compression, bending test system comprising a computer unit, a motor (1) and a plurality of sample testing modules (2) provided on a workbench (3) horizontally or vertically to the ground;

wherein the sample testing modules (2) comprises sample testing modules base plates (39) secured to the workbench (3), a ball screw (16), a displacement sensor (17), a moving beam (18), a clamp unit (19), a linear moving platform unit (23) and a force value sensor (24) provided on the sample testing modules base plates (39); the ball screw (16) and the linear moving platform unit (23) are respectively provided at both ends of the clamp unit (19);

an inner end of the ball screw (16) is fixed to transmission devices, and the ball screw and the moving beam (18) is driven synchronously along the linear guide rail; the displacement sensor (17) is installed on the side surface of a linear guide rail fixing base (30) for detecting the movement displacement of the moving beam (18) in real time;

the linear moving platform unit (23) comprises a trapezoidal screw/lead screw (42) and a linear moving platform guide rail (29), the trapezoidal screw/lead screw (42) slides controllably along the linear moving platform guide rail (29), the force value sensor (24) is fixed on a trapezoidal screw/lead screw pair fixing base (28) through a force value sensor fixing base (25);

an outer end surface of the moving beam (18) is fixedly connected with a first clamp connecting rod (38); the force value sensor (24) is fixedly connected with a second clamp connecting rod (41); two holding portions of the clamp unit (19) for holding a sample (22) are secured to the first clamp connecting rod (38) and the second clamp connecting rod (41) respectively;

a plurality of the sample testing modules (2) are arranged in parallel on the workbench (3), or a plurality of the sample testing modules (2) are uniformly provided in a circumferential direction with a point on the workbench (3) being the center; the ball screw (16) of each sample testing modules (2) faces the center of the circle; the motor (1) drives the ball screw (16) of each of the sample testing modules (2) to rotate synchronously through the transmission devices, realizing a synchronous back and forth movement of the moving beam (18) of each of the sample testing modules (2), and further realizing the synchronous tension, compression, bending and other tests of the sample (22);

the computer unit is respectively connected to the motor (1), the displacement sensor (17), the force value sensor (24), a physical field unit (20) and a visual observation unit (21); the computer unit is configured to independently collect the test data of the displacement sensor (17) and the force value sensor (24) of each of the sample testing modules (2), and calculate and plot the respective measurement parameters and test curves.

2. The high-throughput and small size samples tension, compression, bending test system of claim 1, wherein a plurality of the sample testing modules (2) selectively and independently perform mechanical property tests on the same or different sample (22).

3. The high-throughput and small size samples tension, compression, bending test system of claim 1, wherein the ball screw (16) is installed on the sample testing modules base plate (39) through an inner end ball screw fixing base (37) and an outer end ball screw fixing base (33); two mutually parallel linear guide rails (36) are symmetrically provided on a left side and right side of the ball screw (16); the ball screw (16) is connected with a ball screw pair fixing base (35) between the inner end ball screw fixing base (37) and the outer end ball screw fixing base (33); the moving beam (18) is located at the outer end side of the ball screw (16); the moving beam (18) and the ball screw pair fixing base (35) are parallel to each other and fixed to each other through the moving beam connecting piece (34); and the moving beam (18) and the ball screw pair fixing base (35) are both mounted on the two linear guide rails (36) through a pair of sliders.

4. The high-throughput and small size samples tension, compression, bending test system of claim 1, wherein the trapezoidal screw/lead screw (42) of the linear moving platform unit (23) is provided on the sample testing modules base plate (39) through the trapezoidal screw/lead screw fixing base (40); two mutually parallel linear moving platform guide rails (29) are symmetrically arranged on the left and right sides of the trapezoidal screw/lead screw (42); the inner end of the trapezoidal screw/lead screw (42) is provided with the trapezoidal screw/lead screw pair fixing base (28), the trapezoidal screw/lead screw pair fixing base (28) is mounted on the two linear moving platform guide rails (29) through a pair of sliders.

5. The high-throughput and small size samples tension, compression, bending test system of claim 1, wherein the plurality of the sample testing modules (2) simultaneously perform one of the tension, compression, bending tests.

6. The high-throughput and small size samples tension, compression, bending test system of claim 1, wherein the clamp types of the clamp unit (19) comprises a bar sample clamp, a plate sample clamp, a film sample clamp, a wire clamp, a spring clamp, a three-point bending clamp or a compression clamp.

7. The high-throughput and small size samples tension, compression, bending test system of claim 1, wherein the motor (1) is a servo motor or a stepping motor, and the control mode is a speed controlling mode.

8. The high-throughput and small size samples tension, compression, bending test system of claim 1, wherein the displacement sensor (17) is a contact type displacement sensor or a non-contact type displacement sensor.

9. The high-throughput and small size samples tension, compression, bending test system of claim 1, wherein the force value sensor (24) is a spoke type force value sensor, a column type force value sensor or an S type force value sensor.

10. The high-throughput and small size samples tension, compression, bending test system of claim 1, wherein the physical field unit (20) is one or more of a temperature field, a magnetic field, or a corrosion field.

11. The high-throughput and small size samples tension, compression, bending test system of claim 1, wherein a sample (22) size ranges from 0.1 mm to 120 mm.

12. The high-throughput and small size samples tension, compression, bending test system of claim 1, wherein two ends of the linear guide rails (36) are provided with safety limiting devices (31).

13. The high-throughput and small size samples tension, compression, bending test system of claim 1, wherein the trapezoidal screw/lead screw (42) is a self-locking trapezoidal screw/lead screw (42), and the outer end of the trapezoidal screw/lead screw (42) is provided with a hand wheel (26) for adjusting.

14. The high-throughput and small size samples tension, compression, bending test system of claim 1, wherein the sample testing modules (2) further comprises the physical field unit (20) arranged outside the clamp unit (19).

15. The high-throughput and small size samples tension, compression, bending test system of claim 1, wherein the sample testing modules (2) further comprises a visual observation system (21) arranged above the clamp unit (19), for observing the test course of the samples (22), capturing and analyzing video or images.

16. The high-throughput and small size samples tension, compression, bending test system of claim 1, wherein the force value sensor (24) is fixedly provided on an outer end surface or an inner end surface of the force value sensor fixing base (25); the second clamp connecting rod (41) passes through the force value sensor fixing base (25) and is fixed to the force value sensor (24) when the force value sensor (24) is fixed to the outer end surface of the force value sensor fixing base (25); and the second clamp connecting rod (41) is connected directly to the force value sensor (24) when the force value sensor (24) is fixed to the inner end surface of the force value sensor fixing base (25).

17. The high-throughput and small size samples tension, compression, bending test system of claim 1, wherein when a plurality of the sample testing modules (2) are uniformly distributed in a circumferential direction with a point on the workbench (3) as a center and the ball screw (16) of each of the sample testing modules (2) is directed toward the center, the transmission is a conical gear transmission (4) having a deceleration system (8); the conical gear transmission (4) comprises a large conical gear (6) and a small conical gear (7); the deceleration system (8) is installed at the bottom of the workbench (3); the input end of the reduction system (8) is connected with the power output shaft of the motor (1); and an output shaft (5) of the deceleration system (8) passes out from the central symmetrical point of a plurality of the sample testing modules (2) on the workbench (3); the large conical gear (6) is fixed to the output shaft (5) of the deceleration system (8); the inner end of the ball screw (16) of each of the sample testing modules (2) is fixed to one of the small conical gear (7); and a plurality of the small conical gears (7) intermesh with the large conical gears (6).

18. The high-throughput and small size samples tension, compression, bending test system of claim 17, wherein the deceleration system (8) comprises one or more of a speed reducer, a synchronous pulley speed reduction system, a gear speed reduction system or combinations thereof.

19. The high-throughput and small size samples tension, compression, bending test system of claim 1, wherein when a plurality of the sample testing modules (2) are arranged side by side on the workbench (3), the transmission device is turbine worm gear (9); the turbine worm gear (9) comprises an active worm gear (14), an active worm (15), a passive worm gear (11), a passive worm (12) and a coupling (13); the power output shaft of the motor (1) is fixed to the active worm (15); the active worm gear (14) is engaged with the active worm (15); the left and right ends of the worm gear shaft of the active worm gear (14) are respectively connected to a plurality of the passive worm (12) by the coupling (13); the coupling (13) is mounted on a worm support base (10); and the inner end of the ball screw (16) of each of the sample testing modules (2) is fixed to the passive worm gear (11) intermeshing with corresponding the passive worm (12).

20. A high-throughput and small size samples tension, compression, bending test method by the system of claim 1, comprising:
(1) selecting clamp unit (19) according to a size and mechanical properties of a plurality of samples (22) to be tested, and fixing each of the plurality of samples (22) on the two holding portions of the clamp unit (19);
(2) installing each one of the clamp units (19) on each of the sample testing modules (2), selecting the type of test to be tested and inputting the dimensional parameters of each of the sample (22) from the operation interface of the computer unit;
(3) starting the test while setting a speed controlling mode on the operation interface to control a plurality of the samples; collecting, calculating and processing the detection data of the displacement sensor (17) and the force value sensor (24) of each of the sample testing modules (2) in real time, and drawing the test process curve until the whole test is finished.

21. The high-throughput and small size samples tension, compression, bending test method of claim 20, wherein the method further comprising:
before testing, determining whether a temperature field, a magnetic field or a corrosion physical field shall be loaded according a test need.

22. The high-throughput and small size samples tension, compression, bending test method of claim 20, wherein the method further comprising:

before testing, determining whether a visual observation of the test process shall be conducted according to the a test need.

23. The high-throughput and small size samples tension, compression, bending test method of claim 20, wherein during the test, each one of the sample testing modules (2) operates independently without affecting each other; and the end of one of the sample testing modules (2) test does not affect the continuation of the other of the sample testing modules (2) test.

* * * * *